United States Patent
McCusker (10) Patent No.: US 10,809,743 B1
(45) Date of Patent: Oct. 20, 2020

(54) SYSTEM AND METHOD FOR RECOVERY FROM WAKE VORTEX ENCOUNTERS

(71) Applicant: Rockwell Collins, Inc., Cedar Rapids, IA (US)

(72) Inventor: Patrick D. McCusker, Walker, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 192 days.

(21) Appl. No.: 15/632,072

(22) Filed: Jun. 23, 2017

(51) Int. Cl.
  *G05D 1/08* (2006.01)
  *G05D 1/00* (2006.01)
  *B64C 13/18* (2006.01)
  *B64D 45/00* (2006.01)

(52) U.S. Cl.
  CPC ........... *G05D 1/0816* (2013.01); *B64C 13/18* (2013.01); *B64D 45/00* (2013.01); *G05D 1/0088* (2013.01)

(58) Field of Classification Search
  CPC .... G05D 1/0088; G05D 1/0816; G05D 1/104; B64C 13/18; B64D 45/00
  See application file for complete search history.

(56) References Cited

U.S. PATENT DOCUMENTS

| | | | | |
|---|---|---|---|---|
| 2003/0225489 A1* | 12/2003 | Tsao | .......................... | B64C 13/18 701/9 |
| 2007/0103340 A1* | 5/2007 | Baranov | ................. | G01C 23/00 340/968 |
| 2010/0012789 A1* | 1/2010 | Hillgren | ................ | G05D 1/0615 244/175 |
| 2010/0286848 A1* | 11/2010 | Stassen | ................. | G08G 5/0008 701/3 |
| 2016/0347469 A1* | 12/2016 | Welsh | .................... | B64D 43/02 |
| 2017/0008613 A1* | 1/2017 | Turpin | ................. | G05D 1/0061 |
| 2017/0108868 A1* | 4/2017 | Johnson | ................. | B63H 25/04 |

* cited by examiner

*Primary Examiner* — Donald J Wallace
(74) *Attorney, Agent, or Firm* — Suiter Swantz pc llo (57) ABSTRACT

An airborne platform includes an avionics controller circuit. The avionics controller circuit is configured to receive an ownship orientation from a sensor configured to detect the ownship orientation. The avionics controller circuit is configured to determine an orientation parameter based on the ownship orientation. The avionics controller circuit is configured to compare the orientation parameter to an orientation threshold. The avionics controller circuit is configured to determine the ownship to be in a wake vortex condition based on at least one wake vortex criteria, the at least one wake vortex criteria including the orientation parameter being greater than the orientation threshold for more than a predetermined period of time.

20 Claims, 4 Drawing Sheets

SYSTEM AND METHOD FOR RECOVERY FROM WAKE VORTEX ENCOUNTERS

BACKGROUND

The inventive concepts disclosed herein relate generally to the field of avionics systems. More particularly, embodiments of the inventive concepts disclosed herein relate to systems and methods for recovery from wake vortex encounters.

Aircraft produce wingtip vortices whenever the wings are generating lift (e.g., whenever the nose wheel is off the ground). The vortices may persist for a significant duration of time after the aircraft has passed. Other aircraft following behind or crossing below the aircraft or a path traversed by the aircraft previously can encounter significant turbulence from these wingtip vortices. For example, wake vortices created by an Airbus A380 have persisted with sufficient intensity to cause a business jet passing through the vortices ten minutes later to roll over.

Vortices cannot be seen by a pilot, and existing sensor systems, such as radar systems, are incapable of detecting vortices. In existing aircraft, pilots may avoid vortices from other aircraft by maintaining lateral and vertical distances (i.e., separation) from other aircraft. However, this method may not be reliable, and aircraft do encounter wake vortices with catastrophic results.

It is assumed that a typical pilot, particularly a pilot of a light jet or very light jet aircraft, may have some training for recovering from unusual attitudes during flight, such as for recovering from mild to moderate turbulence without assistance. However, it is unlikely that the typical pilot has sufficient training and flight hours experience to take the appropriate action to restore the aircraft to stable flight after encountering a wake vortex.

SUMMARY

In one aspect, the inventive concepts disclosed herein are directed to an avionics controller circuit. The avionics controller circuit is configured to receive an ownship orientation from a sensor configured to detect the ownship orientation. The avionics controller circuit is configured to determine an orientation parameter based on the ownship orientation. The avionics controller circuit is configured to compare the orientation parameter to an orientation threshold. The avionics controller circuit is configured to determine the ownship to be in a wake vortex condition based on at least one wake vortex criteria, the at least one wake vortex criteria including the orientation parameter being greater than the orientation threshold for more than a predetermined period of time.

In a further aspect, the inventive concepts disclosed herein are directed to an avionics control system. The avionics control system includes an avionics controller circuit. The avionics controller circuit is configured to receive an orientation of an ownship from a sensor of the ownship, the sensor configured to detect the orientation. The avionics controller circuit is configured to determine a magnitude of a potential wake vortex condition based on the orientation. The avionics controller circuit is configured to initiate a timer responsive to the magnitude being greater than a threshold magnitude. The avionics controller circuit is configured to compare a time elapsed after initiation of the timer to a time threshold. The avionics controller circuit is configured to trigger an automated vortex recovery responsive to the time elapsed being greater than the time threshold. The avionics controller circuit is configured to execute the automated vortex recovery.

In a further aspect, the inventive concepts disclosed herein are directed to a method. The method includes receiving an ownship orientation from a sensor configured to detect ownship orientation. The method includes determining an orientation parameter based on the ownship orientation. The method includes comparing the orientation parameter to an orientation threshold. The method includes determining the ownship to be in a wake vortex condition based on at least one wake vortex criteria, the at least one wake vortex criteria including the orientation parameter being greater than the orientation threshold for more than a predetermined period of time.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to systems and methods for recovery from wake vortex encounters. The inventive concepts disclosed herein can be utilized in a number of control systems for various types of electronic avionics applications for airborne platforms (e.g., aircraft), including but not limited to flight control, autoflight, autothrottle, and autopilot systems, navigation systems, flight display systems, communications systems, radar systems, electric power systems, engine control systems, and monitor warning systems. While the present disclosure describes systems and methods implementable for an airborne platform, the inventive concepts disclosed herein may be used in any type of application or environment (e.g., in another aircraft, a spacecraft, an autonomous vehicle, a ground-based vehicle, a water-based or underwater vehicle, a subsurface or subterranean vehicle, a satellite, an aeronautical platform, or in a non-vehicle application such as a stationary communications, sensing, or testing system, a ground-based display system, an air traffic control system, a radar system, a virtual display system). The inventive concepts disclosed herein may be implemented on light jet or very light jet aircraft, which may have a single pilot and modern avionics systems, as well as larger jets (e.g., commercial jets) or turbo-props.

In some embodiments, an airborne platform includes an avionics controller circuit. The avionics controller circuit is configured to receive an ownship orientation from a sensor configured to detect the ownship orientation. The avionics controller circuit is configured to determine an orientation parameter based on the ownship orientation. The avionics controller circuit is configured to compare the orientation parameter to an orientation threshold. The avionics controller circuit is configured to determine the ownship to be in a wake vortex condition based on at least one wake vortex criteria, the at least one wake vortex criteria including the orientation parameter being greater than the orientation threshold for more than a predetermined period of time.

The system can be integrated with an airborne platform or other platform as described herein. For example, the system can be included in or communicatively coupled to an avionics system, navigation system, or autopilot system of the airborne platform, including for controlling operation of unmanned vehicles and autonomous vehicles.

In some embodiments, systems manufactured in accordance with the inventive concepts disclosed herein can improve the operation of aircraft or other platforms by detecting wake vortexes, which existing systems are unable to detect effectively, such as for alerting a pilot of the wake vortex, or for executing automated vortex recovery maneuvers which typical pilots may not have the training or experience to execute after becoming aware of wake vortexes. As such, systems manufactured in accordance with the inventive concepts disclosed herein can improve the operation of aircraft or other platforms by preventing hazardous flight conditions resulting from wake vortexes.

Figure 1:
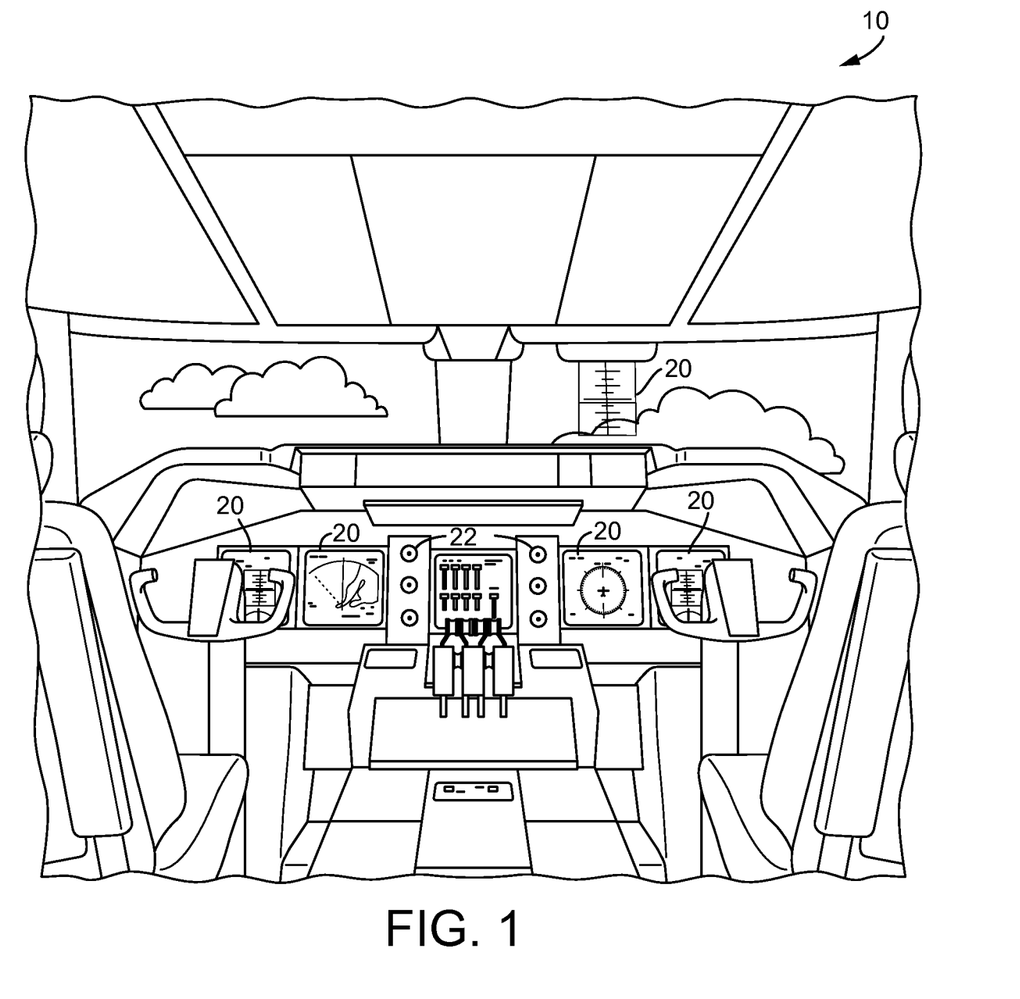
FIG. 1 is a schematic illustration of an exemplary embodiment of an aircraft control center according to the inventive concepts disclosed herein.

Referring to FIG. 1, a perspective view schematic illustration of an aircraft control center or cockpit 10 is shown accordingly to an exemplary embodiment of the inventive concepts disclosed herein. The aircraft control center 10 can be configured for an aircraft operator or other user to interact with avionics systems of an airborne platform. The aircraft control center 10 may include one or more flight displays 20 and one or more user interface ("UP") elements 22. The flight displays 20 may be implemented using any of a variety of display technologies, including CRT, LCD, organic LED, dot matrix display, and others. The flight displays 20 may be navigation (NAV) displays, primary flight displays, electronic flight bag displays, tablets such as iPad® computers manufactured by Apple, Inc. or tablet computers, synthetic vision system displays, head up displays (HUDs) with or without a projector, wearable displays, watches, Google Glass®. The flight displays 20 may be used to provide information to the flight crew, thereby increasing visual range and enhancing decision-making abilities. One or more of the flight displays 20 may be configured to function as, for example, a primary flight display (PFD) used to display altitude, airspeed, vertical speed, and navigation and traffic collision avoidance system (TCAS) advisories. One or more of the flight displays 20 may also be configured to function as, for example, a multi-function display used to display navigation maps, weather radar, electronic charts, TCAS traffic, aircraft maintenance data and electronic checklists, manuals, and procedures. One or more of the flight displays 20 may also be configured to function as, for example, an engine indicating and crew-alerting system (EICAS) display used to display critical engine and system status data. The flight displays 20 may be used to display indications of wake vortexes or warnings regarding detected or potential wake vortexes, or that the airborne platform is subject to a wake vortex. Other types and functions of the flight displays 20 are contemplated as well.

In some embodiments, the flight displays 20 may provide an output based on data received from a system external to an aircraft, such as a ground-based weather radar system, satellite-based system, or from a system of another aircraft. In some embodiments, the flight displays 20 may provide an output from an onboard aircraft-based weather radar system, LIDAR system, infrared system or other system on an aircraft. For example, the flight displays 20 may include a weather display, a weather radar map, and a terrain display. In some embodiments, the flight displays 20 may provide an output based on a combination of data received from multiple external systems or from at least one external system and an onboard aircraft-based system. The flight displays 20 may include an electronic display or a synthetic vision system (SVS). For example, the flight displays 20 may include a display configured to display a two-dimensional (2-D) image, a three dimensional (3-D) perspective image of terrain and/or weather information, or a four dimensional (4-D) display of weather information or forecast information. Other views of terrain and/or weather information may also be provided (e.g., plan view, horizontal view, vertical view). The views may include monochrome or color graphical representations of the terrain and/or weather information. Graphical representations of weather or terrain may include an indication of altitude of the weather or terrain or the altitude relative to an aircraft.

The UI elements 22 may include, for example, dials, switches, buttons, touch screens, keyboards, a mouse, joysticks, cursor control devices (CCDs), menus on Multi-Functional Displays (MFDs), or other multi-function key pads certified for use with avionics systems. The UI elements may be incorporated by the flight displays 20 (e.g., the UI elements 22 may appear on or be part of the flight displays 20). The UI elements 22 may be configured to, for example, allow an aircraft crew member to interact with various avionics applications and perform functions such as data entry, manipulation of navigation maps, and moving among and selecting checklist items. For example, the UI elements 22 may be used to adjust features of the flight displays 20, such as contrast, brightness, width, and length. The UI elements 22 may also (or alternatively) be used by an aircraft crew member to interface with or manipulate the displays of the flight displays 20. For example, the UI elements 22 may be used by aircraft crew members to adjust the brightness, contrast, and information displayed on the flight displays 20. The UI elements 22 may additionally be used to acknowledge or dismiss an indicator provided by the flight displays 20. The UI elements 22 may be used to correct errors on the flight displays 20. The UI elements 22 may also be used to adjust the radar antenna tilt, radar display gain, and to select vertical sweep azimuths. Other UI elements 22, such as indicator lights, displays, display elements, and audio alerting devices, may be configured to warn of potentially threatening conditions such as severe weather, terrain, and obstacles, such as potential collisions with other aircraft. In some embodiments, the UI elements 22 may be configured to control operation of aircraft control surfaces.

Figure 2:
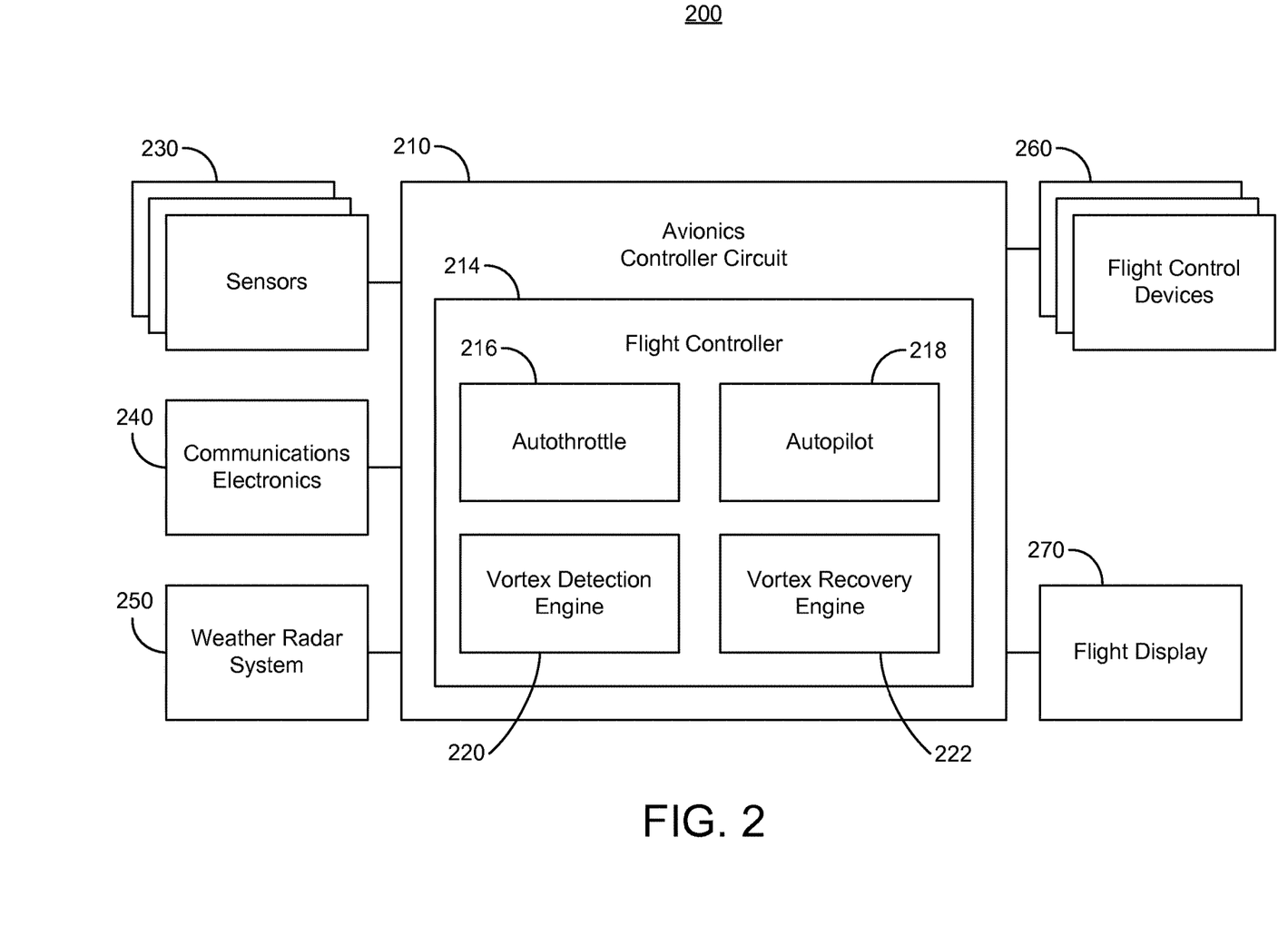
FIG. 2 is a block diagram of an exemplary embodiment of a system for detection and recovery from wake vortex encounters according to the inventive concepts disclosed herein.

Referring now to FIG. 2, a schematic diagram of a system 200 is shown according to an exemplary embodiment of the inventive concepts disclosed herein. The system 200 can be implemented as part of a vehicle, an aircraft, an autonomous vehicle, or any other platform, such as an airborne platform incorporating features of the aircraft control center 10 of FIG. 1. Briefly, the system 200 includes an avionics controller circuit 210, sensors 230, communications electronics 240, a weather radar system 250, flight control devices 260, and a flight display 270.

The avionics controller circuit 210 is configured to control operation of various components of an ownship. The avionics controller circuit 210 may be implemented using a processing circuit (e.g., control circuit, processing electronics) including a processor and memory. The processor may be implemented as a specific purpose processor, an application specific integrated circuit (ASIC), one or more field programmable gate arrays (FPGAs), a group of processing components, or other suitable electronic processing components. The memory is one or more devices (e.g., RAM, ROM, flash memory, hard disk storage) for storing data and computer code for completing and facilitating the various user or client processes, layers, and modules described in the present disclosure. The memory may be or include volatile memory or non-volatile memory and may include database components, object code components, script components, or any other type of information structure for supporting the various activities and information structures of the inventive concepts disclosed herein. The memory is communicably connected to the processor and includes computer code or instruction modules for executing one or more processes described herein. The memory includes various circuits, software engines, and/or modules that cause the processor to execute the systems and methods described herein, such as for wake vortex detection and recovery operations. Electronic hardware similar to the processor and memory may also be used to implement various components not shown in. While FIG. 2 illustrates the avionics controller circuit 210 as a single component, it will be appreciated that in some embodiments, the avionics controller circuit 210 and/or the processes executed by the avionics controller circuit 210 may be distributed across multiple processing cores (e.g., processing cores of a multi-core processor) and/or multiple processing circuits (e.g., in a distributed computing environment).

In some embodiments, the avionics controller circuit 210 includes a flight controller 214. The flight controller 214 can generate control commands to control operation of various components of the ownship, such as flight control devices 260. The flight controller 214 can generate control commands automatically or responsive to user input (e.g., user input received via UI elements 22 described with reference to FIG. 1). The flight controller 214 can include autoflight systems such as an autothrottle 216 and/or an autopilot 218. The flight controller 214 can include a vortex detection engine 220. The flight controller 214 can include a vortex recovery engine 222. While FIG. 2 illustrates the autothrottle 216, autopilot 218, vortex detection engine 220, and vortex recovery engine 222 as distinct components, it will be appreciated that in some embodiments, these components may be subcomponents of one another, may share executable computer code routines, and/or may issue control command signals to one another to cause the various components to execute desired functions. In some embodiments, the avionics controller circuit 210 includes one or more of an autoflight system, an electronic flight instrument system, or an engine indicating and crew alerting system, each of which may include some or all of the components of the flight controller 214.

The sensors 230 are configured to detect information regarding the ownship or an environment about the ownship. The sensors 230 can include one or more of an inertial measurement unit, a GPS device, a global navigation satellite system receiver, an altimeter, a gyroscope, a magnetic compass, an accelerometer, a temperature sensor, a vision system (e.g., a camera, an infrared image sensor, a LIDAR), or an air data sensor (e.g., sensor(s) configured to detect and output an indication of static pressure). In some embodiments, the sensors 230 include an attitude and heading reference system or an inertial reference system.

The communications electronics 240 are configured to receive data from and transmit data to entities remote from the ownship. The avionics controller circuit 210 can cause the communications electronics 240 to transmit information. The avionics controller circuit 210 can receive information via the communications electronics 240. The communications electronics 240 can include transmitter hardware and receiver hardware.

The weather radar system 250 is configured to output radar signals and receive return radar signals, such as for generating weather information based on comparing the outputted signals to the return signals. The weather radar system 250 can generate and transmit an indication of weather (e.g., transmit weather data), such as for display on flight display 270 or for the avionics controller circuit 210 to use for determining flight operations.

The flight control devices 260 are configured to control operation of the ownship, such as for maneuvering the ownship. The flight control devices 260 can include a throttle configured to control an acceleration of the ownship. The flight control devices 260 can include an orientation control device configured to control an orientation of the ownship (e.g., a yoke, a side stick, a military-style control stick, a helicopter-style control stick). The flight control devices 260 can be configured to control flight control surfaces (e.g., ailerons, elevator, rudder, spoilers, flaps, slats, air brakes). The flight control devices 260 can be configured to control at least one of an acceleration or an orientation of the ownship. The flight control devices 260 can control orientation of the ownship about the roll, pitch, and/or yaw axes.

In some embodiments, the system 200 includes a flight display 270. The flight display 270 can be similar or identical to the flight displays 20 described with reference to FIG. 1. The avionics controller circuit 210 can cause the flight display 270 to display an indication of a wake vortex condition or a warning regarding a wake vortex condition.

The flight controller 214 may include various autoflight controllers, such as autothrottle 216 and/or autopilot 218. The autothrottle 216 is configured to automatically control operation of a throttle of the ownship, such as to receive an indication of a desired speed or acceleration of the ownship and control operation of the throttle to achieve the desired speed or acceleration. The autopilot 218 is configured to automatically control maneuvering of the ownship, such as to control the trajectory of the ownship based on a desired destination of the ownship.

The vortex detection engine 220 can be configured to detect whether the ownship is subject to a wake vortex condition, which may reduce risks to stable operation of the ownship, or allow for immediate flight control correction to prevent flight hazards resulting from such risks.

The vortex detection engine 220 can receive an ownship orientation from the at least one sensor 230, where the at least one sensor 230 is configured to detect the ownship orientation. For example, the vortex detection engine 220 can receive a measure of angular orientation of the ownship. In some embodiments, the measure of the angular orientation includes a roll angle (e.g., an angle about the roll axis relative to level flight). The measure of the angular orientation may also include at least one of a yaw angle or a pitch angle.

In some embodiments, the ownship orientation includes a rate of change of the ownship orientation, such as a roll speed (e.g., $$\frac{d\omega}{dt},$$

where ω is the roll angle) or a roll acceleration (e.g., $$\frac{d^2\omega}{dt^2}$$

The vortex detection engine 220 may also be configured to determine the rate of change of the ownship orientation. For example, the vortex detection engine 220 can receive the ownship orientation at a first time (or send a request signal to the sensor 230 for the ownship orientation at the first time), receive the ownship orientation at a second time, and determine the rate of change based on the two received ownship orientations, the first time, and the second time. The vortex detection engine 220 may be configured to periodically request the at least one sensor 230 for the ownship orientation (or the at least one sensor 230 may be configured to periodically transmit the ownship orientation to the vortex detection engine 220) and regularly monitor the ownship orientation and determine the rate of change of the ownship orientation.

The vortex detection engine 220 can be configured to determine an orientation parameter based on the ownship orientation. The orientation parameter may include the measure of the angular orientation. For example, the orientation parameter may include the roll angle. The orientation parameter may include at least one of a roll angle, a roll rate, or a roll acceleration.

The vortex detection engine 220 can determine whether the ownship is in a wake vortex condition based on wake vortex criteria. For example, the vortex detection engine 220 can include a wake vortex criteria database storing at least one wake vortex criteria. The vortex detection engine 220 can retrieve the wake vortex criteria from the database to determine whether the ownship is in the wake vortex condition.

In some embodiments, the wake vortex criteria is associated with the orientation parameter. For example, the wake vortex criteria may include an orientation threshold. The vortex detection engine 220 can compare the orientation parameter to the orientation threshold The vortex detection engine 220 can determine that the wake vortex criteria is satisfied if the orientation parameter is greater than the orientation threshold.

The wake vortex criteria for the orientation parameter may be associated with a duration requirement, which may provide greater confidence for determining whether the ownship is in a wake vortex condition. For example, the vortex detection engine 220 can determine the wake vortex criteria to be satisfied if the orientation parameter is greater than the orientation threshold for more than a predetermined period of time. The vortex detection engine 220 can compare the orientation parameter to the orientation threshold, initiate a timer responsive to determining that the orientation parameter is greater than the orientation threshold, compare an elapsed time of the timer to the predetermined period of time (e.g., periodically poll the timer to retrieve the elapsed time), and determine the wake vortex criteria (for the orientation threshold) to be satisfied if the elapsed time is greater than the predetermined period of time. The vortex detection engine 220 can stop the timer responsive to the orientation parameter being less than or falling below the orientation threshold before the elapsed time becomes greater than the predetermined period of time. The predetermined period of time may be on the order of seconds or fractions of seconds (e.g., 0.1 seconds, 0.5 seconds, 1 second, 3 seconds, 5 seconds, 10 seconds). The predetermined period of time may be determined based on a characteristic of the ownship (e.g., similar to factors described below for the orientation threshold).

In some embodiments, the orientation threshold is associated with a characteristic of the ownship, such as a characteristic determined based on a structure of the ownship. For example, the orientation threshold may be associated with at least one of a size, weight, or performance characteristic of the ownship. The characteristic may correspond to how easily the ownship may undergo a hazardous movement (e.g., an excessive roll) when encountering a wake vortex. The characteristic may correspond to a value of the orientation parameter at which it is unlikely that a typical pilot of the ownship can safely return the ownship to level flight when the ownship is in a wake vortex condition. In some embodiments, the orientation threshold includes a roll angle that is greater than or equal to forty degrees and less than or equal to sixty degrees relative to level flight (e.g., relative to an angular orientation with respect to the roll axis at which a direction vector associated with movement of the ownship is perpendicular to a direction of gravity).

In some embodiments, the at least one wake vortex criteria includes a criteria which is satisfied based on movement (e.g., unintended movement) of an aircraft control surface. For example, an erroneous maneuver, such as an erroneous roll movement, may result from an autoflight system failure (e.g., autopilot failure) causing failure in an aircraft control surface.

The vortex detection engine 220 can be configured to monitor motion of the aircraft control surface, such as to distinguish controlled motion of the ownship based on control of the aircraft control surface (e.g., based on a control signal transmitted by the flight control devices 260) from a motion of the ownship caused by a wake vortex, such as an excessive rolling motion. As such, the vortex detection engine 220 can be configured to prevent execution of a wake vortex recovery if the ownship is being purposefully controlled to execute a maneuver (e.g., a roll) which would otherwise trigger recovery maneuvers. As described herein, the vortex detection engine 230 can be configured to detect a wake vortex condition based on monitoring motion of the ownship, such as by monitoring the attitude of the ownship. Monitoring the motion of the aircraft control surface may allow for the vortex detection engine 230 to eliminate controlled motion of the ownship as a cause of an attitude change, as opposed to a wake vortex condition. For example, if the aircraft control surface moves, and the ownship moves in a corresponding direction, the vortex detection engine 230 can determine that a wake vortex condition has not been encountered. Similarly, the at least one wake vortex criteria can include a determination that motion of the ownship (e.g., based on ownship orientation) is not caused by controlled motion of the ownship resulting from operation of an aircraft control surface, which can prevent a false indication of a wake vortex encounter (and thus prevent an unnecessary triggering of a vortex recovery maneuver as will be described below with reference to the vortex recovery engine 222).

The vortex detection engine 220 can receive aircraft control surface position data from a sensor 230 configured to detect the position and/or orientation of the aircraft control surface. The vortex detection engine 220 can determine a motion parameter based on the aircraft control surface position data. For example, the aircraft control surface may have a known or expected range of motion, and the vortex detection engine 220 can determine the motion parameter to be a relative or absolute value within the range of motion of the aircraft control surface. In some embodiments, the vortex detection engine 220 is configured to receive or monitor a control signal transmitted by the flight control devices 260 to one or more aircraft control surfaces, and determine an expected motion of the one or more aircraft control surfaces based on the control signal. For example, the vortex detection engine 220 can store and execute a model or database (e.g., lookup table) associating control signals with aircraft control surface motion to determine the expected motion.

The vortex detection engine 220 can compare the motion parameter of the aircraft control surface to a control surface motion threshold. The control surface motion threshold may include the expected motion. The vortex detection engine 220 can store a plurality of control surface motion thresholds corresponding to each aircraft control surface of the ownship, and compare respective motion parameters to respective control surface motion thresholds. The vortex detection engine 220 can determine the wake vortex criteria associated with the aircraft control surfaces to be satisfied if one or more of the motion parameters is greater than the corresponding control surface motion threshold.

In some embodiments, the wake vortex criteria associated with the aircraft control surfaces is satisfied if the one or more motion parameters are greater than the corresponding control surface motion thresholds for more than a predetermined period of time. Similar to the predetermined period of time for the orientation parameter, the predetermined period of time for the motion parameter(s) may be on the order of seconds; the predetermined period of time for the motion parameters may be determined based on a characteristic of the ownship.

The vortex detection engine 220 can be configured to output an indication of the wake vortex condition via a user interface device. The user interface device may be the flight display 270 or other UI elements 22. The user interface device may be an audio output device. The vortex detection engine 220 can cause the user interface device to output the indication responsive to determining that the at least one wake vortex condition is satisfied.

In some embodiments, the at least one wake vortex criteria is associated with a state of an autoflight system, such as a state of the autothrottle 216 or the autopilot 218. For example, the at least one wake vortex criteria can be based on whether the autoflight system is in a state of nominal operation or a failure state. The vortex detection engine 220 can monitor operation of the autoflight system to detect the state of the autoflight system. The at least one wake vortex criteria associated with the state of the autoflight system can be satisfied based on the autoflight system not having failed (e.g., not being in a failure state). In some embodiments, the wake vortex detection engine 220 is configured to receive or monitor a control command outputted by the autoflight system for controlling operation of an aircraft control surface using the flight control devices 260, and detect the state of the autoflight system based on the control command. In some embodiments, the vortex detection engine 220 may determine the autoflight system to be in a failure state based on at least one of identifying an error code in the control command, determining that an expected control command has not been transmitted, or transmitting a test signal to the autoflight system and not receiving an appropriate acknowledgement signal within a predetermined period of time. In some embodiments, the vortex detection engine 220 can use an output command of the autoflight system to distinguish a wake vortex condition from a controlled motion of the ownship. Similar to monitoring of an aircraft control surface, the vortex detection engine 220 can monitor output commands of the autoflight system to exclude non-vortex causes of aircraft motion from triggering a false vortex warning (and recovery). For example, the vortex detection engine 220 can monitor an output command of the autoflight system, determine an expected motion of the ownship based on the output command, compare the expected motion to an actual motion (e.g., compare an expected attitude calculated using a motion function or a lookup table) to an actual attitude, and determine the wake vortex criteria for the output command to not be satisfied if a difference between the expected motion and actual motion is less than a threshold difference. In some such embodiments, the vortex detection engine 220 can monitor the output commands of the autoflight system as a proxy for monitoring or measuring positions of control surfaces, which may be beneficial by reducing the need for providing difficult-to-install or expensive sensors on the aircraft control surfaces.

The vortex recovery engine 222 can be configured to control operation of the ownship to execute one or more maneuvers when the ownship is in a wake vortex condition. The vortex recovery engine 222 can execute one or more maneuvers configured to cause the ownship to return to level flight or safe flight, or to return to an operational state (e.g., orientation) in which a typical pilot of the ownship may be expected to safely control operation of the ownship. The vortex recovery engine 222 can be configured to cause the flight display 270 or other user interface devices (e.g., an audio output device) to output maneuver instructions to a pilot.

In some embodiments, the vortex recovery engine 222 can cause the vortex detection engine 220 to detect a wake vortex condition (as described above). The vortex recovery engine 222 can also execute recovery operations as described herein responsive to the vortex detection engine 220 detecting a wake vortex condition. For example, responsive to determining the ownship to be in a wake vortex condition, the vortex detection engine 220 can output an indication of the wake vortex condition to the vortex recovery engine 222.

In some embodiments, similar to the vortex detection engine 220, the vortex recovery engine 222 is configured to receive the orientation of the ownship from the at least one sensor 230. For example, the vortex recovery engine 222 can receive a roll angle from the at least one sensor 230. The vortex recovery engine 222 can receive or determine a roll speed or roll acceleration.

The vortex recovery engine 222 can determine a magnitude of a potential wake vortex condition based on the orientation (or a parameter derived from the orientation). The magnitude of the potential wake vortex condition may be determined based on the orientation being greater than a magnitude threshold for the orientation. For example, the magnitude may be determined based on a roll angle, roll rate, or roll acceleration being excessive or undesirable (e.g., greater than the magnitude threshold). The vortex recovery engine 222 can be configured to compare the orientation to the magnitude threshold and determine the magnitude to be a difference between orientation and the magnitude threshold if the orientation is greater than the magnitude threshold. For example, the vortex recovery engine 222 can determine the difference to be a value by which the roll angle is greater than a threshold roll angle (e.g., a threshold roll angle analogous to the threshold used to detect the wake vortex condition), by which the roll speed is greater than a threshold roll speed, or by which the roll acceleration is greater than a threshold roll acceleration. The vortex recovery engine 222 can be configured to compute the magnitude based on one or more of the comparisons between the roll rate, roll speed, or roll acceleration and the corresponding thresholds. For example, the vortex recovery engine 222 can be configured to calculate a plurality of magnitudes based on comparing each of the orientation parameters to the corresponding thresholds, and then compute a weighted sum of the plurality of magnitudes to determine a final magnitude (e.g., for subsequent processing). As such, the vortex recovery engine 222 may be able to distinguish situations where the roll angle may be greater than the roll angle threshold but the roll acceleration is negative (which may suggest that the roll is under control or that the ownship is returning to level flight) from situations where the roll angle may or may not be greater than the roll angle threshold but the roll acceleration is positive (which may suggest that the ownship is about to be in a wake vortex condition if not already).

In some embodiments, the vortex recovery engine 222 is configured to trigger an automated vortex recovery (e.g., generate and output a trigger signal configured to cause one or more maneuvers of the automated vortex recovery). The trigger signal may be generated based on receiving an indication from the vortex detection engine 220 that a wake vortex condition has been detected or determined. The trigger signal may be generated based on the magnitude of the potential wake vortex condition.

In some embodiments, the vortex recovery engine 222 is configured to compare the magnitude of the potential wake vortex condition to a magnitude threshold to confirm whether the potential wake vortex condition is an actual wake vortex condition. The magnitude threshold may be determined in a similar manner as the orientation parameters used by the vortex detection engine 220 to determine whether the at least one wake vortex criteria is satisfied. In some embodiments, the magnitude threshold is zero (e.g., the magnitude calculated by the vortex recovery engine 222 may be determined based on the orientation parameters such as roll angle, roll speed, or roll acceleration being greater than corresponding thresholds as described above, such that the calculated magnitude already indicates an actual wake vortex condition; the magnitude may become indeterminate or less than zero if the ownship returns to level flight).

In some embodiments, the vortex recovery engine 222 is configured to generate and output the trigger signal responsive to the magnitude being greater than the magnitude threshold for a predetermined time threshold. The vortex recovery engine 222 can determine a duration of the vortex condition by initiating a timer responsive to the magnitude being greater than the magnitude threshold, comparing a time elapsed after initiation of the timer to the predetermined time threshold, and generating the trigger signal for triggering the automated vortex recovery responsive to the time elapsed being greater than the predetermined time threshold. The predetermined time threshold may be on the order of seconds (e.g., 0.1 seconds, 1 second, 3 seconds, 5 seconds, 10 seconds). The predetermined time threshold may be determined based on a characteristic of the ownship.

The vortex recovery engine 222 can be configured to execute the automated vortex recovery by causing the ownship to perform one or more maneuvers. The vortex recovery engine 222 can use the trigger signal or other control signals to cause the flight control devices 260 to execute the one or more maneuvers. For example, where the flight control devices 260 include a throttle and a yoke, the vortex recovery engine 222 can cause the throttle to control an airspeed of the ownship and the yoke to control the orientation of the ownship, such as to restore the ownship to level flight or direct the ownship towards a level flight state or other desired flight state.

In some embodiments, the vortex recovery engine 222 can executed the automated vortex recovery by controlling operation of at least one of the autothrottle 216 or the autopilot 218. For example, the at least one of the autothrottle 216 or the autopilot 218 may store an automated vortex recovery protocol, and execute the automated vortex recovery protocol (e.g., execute one or more maneuvers) responsive to receiving the trigger signal from the vortex recovery engine 222.

The vortex recovery engine 222 may be configured to execute a specific automated vortex recovery depending on flight conditions, such as a phase of flight. The vortex recovery engine 222 may be configured to execute an automated vortex recovery specific to the phase of flight depending on whether the ownship is in an approach phase of the flight. The vortex recovery engine 222 can determine the phase of the flight based on a flight plan, which may be stored by the avionics controller circuit 210 (e.g., stored by the autopilot 218). The vortex recovery engine 222 can determine the phase of the flight based on at least one of an altitude, a position, or a heading of the ownship based on sensor data received from the at least one sensor 230.

In some embodiments, responsive to determining that the ownship is in the approach phase of the flight, the vortex recovery engine 222 can (1) at least one of alert a pilot to increase an airspeed of the ownship, such as by outputting instructions via a user interface device such as the flight display 270, or cause the autothrottle 216 to advance the throttle of the flight control devices 260; (2) push the yoke of the flight control devices forward, such as to unload wings of the ownship; (3) cause the ownship to continue a roll in a direction of the wake vortex until the ownship returns to level flight (e.g., when wings return to level flight); and (4) transition the ownship to a normal go around mode for thrust and pitch control. The vortex recovery engine 222 can periodically receive and/or request the orientation of the ownship from the at least one sensor 230 to determine when the ownship has returned to level flight (e.g., the wings have returned to level flight).

In some embodiments, responsive to determining that the ownship is not in the approach phase of the flight, the vortex recovery engine 222 can (1) at least one of alert the pilot to maintain the airspeed of the ownship or cause the autothrottle 216 to control operation of the throttle of the flight control devices 260 to maintain the airspeed of the ownship; (2) push the yoke of the flight control devices 260 forward, such as to unload wings of the ownship; (3) cause the ownship to continue to roll in the direction of the wake vortex until the ownship returns to level flight (e.g., when wings return to level flight); and (4) transition the ownship to normal altitude hold and speed hold for a vertical axis, and heading hold for a lateral axis.

In some embodiments, the vortex recovery engine 222 is configured to restrict operation of the flight control devices 260 while executing the automated vortex recovery. For example, the vortex recovery engine 222 can restrict operation of at least one of a roll spoiler, a pitch trim system, or a yaw damping system of the flight control devices 260. The flight control devices 260 may be configured to control operation of aircraft control surfaces based on mode information in order to implement the restriction by the vortex recovery engine 222. For example, the flight control devices 260 may be configured to operate in a normal mode or a vortex recovery mode. The flight control devices 260 can operate in the normal mode by default, and switch to the vortex recovery mode responsive to receiving a control signal from the vortex recovery engine 222 (e.g., receiving the trigger signal or another signal including instructions to switch to the vortex recovery mode). In the vortex recovery mode, the flight control devices 260 may be restricted from controlling operation of aircraft control surfaces unless a command signal is received from the vortex recovery engine 222. For example, in the vortex recovery mode, the flight control devices 260 may not execute normal mode functions, or may execute at least some normal mode functions (e.g., for calculating parameters or generating control signals) but may not output control signals to the aircraft control surfaces unless a command signal is received from the vortex recovery engine 222 instructing the flight control devices 260 to output the control signals to the aircraft control surfaces.

In some embodiments, the vortex recovery engine 222 is configured to ensure that an autoflight system, such as the autothrottle 216 or the autopilot 218, is engaged while executing the automated vortex recovery. This may reduce the risk that autoflight system failure causes the automated vortex recovery to be aborted or to otherwise result in undesired or hazardous flight maneuvers. The vortex recovery engine 222 can determine whether the autoflight system is engaged. For example, the vortex recovery engine 222 can request the autoflight system to transmit an engagement signal indicating that the autoflight system is engaged (e.g., request the engagement signal responsive to determining or receiving an indication that the ownship is in a wake vortex condition, or responsive to generating or outputting the trigger signal). The autoflight system may also be configured to periodically transmit the engagement signal to the vortex recovery engine 222. The vortex recovery engine 222 can prevent the autoflight system from disengaging while executing the automated vortex recovery if the autoflight system is engaged, and automatically engage the autoflight system if the autoflight system is disengaged. For example, the vortex recovery engine 222 can transmit a reset command to reset operation of the autoflight system if the vortex recovery engine 222 determines that the autoflight system is not engaged.

Figure 3:
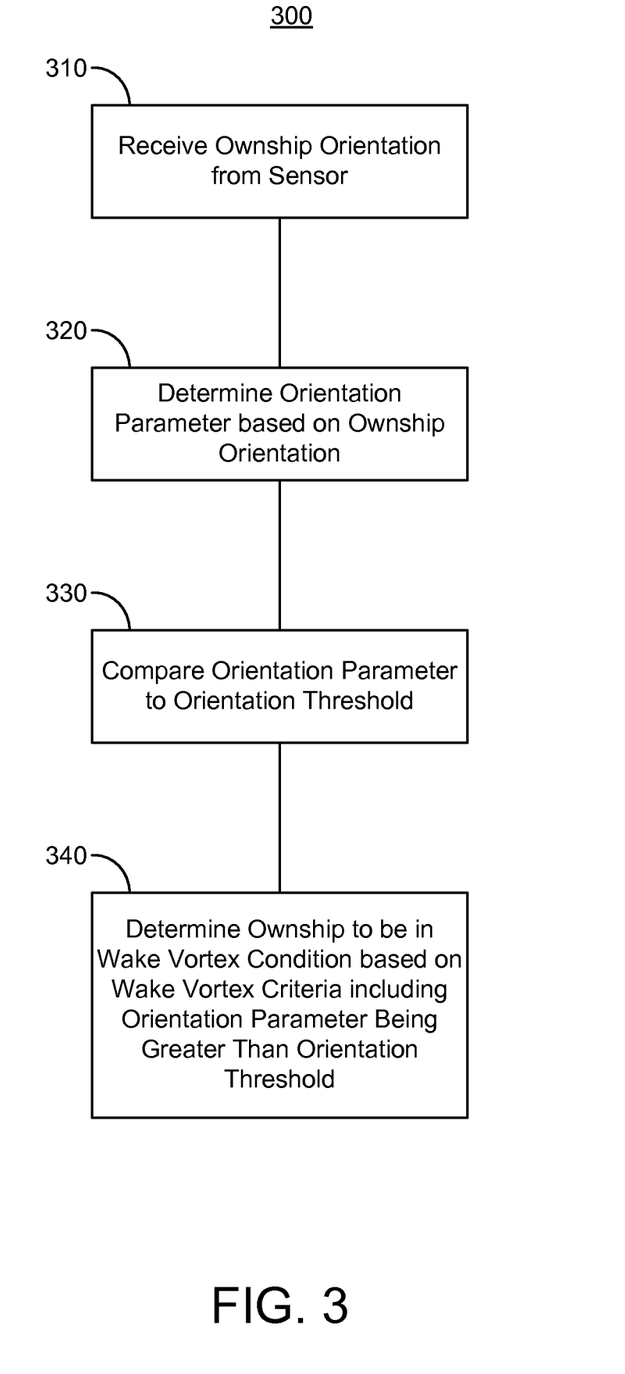
FIG. 3 is a diagram of an exemplary embodiment of another method according to the inventive concepts disclosed herein.

Referring now to FIG. 3, an exemplary embodiment of a method 400 according to the inventive concepts disclosed herein may include the following steps. The method 400 may be performed using various hardware, apparatuses, and systems disclosed herein, such as the aircraft control center 10, the system 200, the avionics controller circuit 210, and/or components thereof.

A step (310) may include receiving an ownship orientation from a sensor configured to detect ownship orientation. The sensor may include one or more of an inertial measurement unit, a GPS device, a global navigation satellite system receiver, an altimeter, a gyroscope, a magnetic compass, an accelerometer, a temperature sensor, a vision system (e.g., a camera, an infrared image sensor, a LIDAR), or an air data sensor (e.g., sensor(s) configured to detect and output an indication of static pressure). In some embodiments, the sensor includes an attitude and heading reference system or an inertial reference system. The ownship orientation may include an angular orientation of the ownship (e.g., relative to level flight).

A step (320) may include determining an orientation parameter based on the ownship orientation. The orientation parameter may include the measure of the angular orientation of the ownship. For example, the orientation parameter may include the roll angle. The orientation parameter may include at least one of a roll angle, a roll rate, or a roll acceleration.

A step (330) may include comparing the orientation parameter to an orientation threshold. In some embodiments, the orientation threshold is associated with a characteristic of the ownship, such as a characteristic determined based on a structure of the ownship. For example, the orientation threshold may be associated with at least one of a size, weight, or performance characteristic of the ownship. The characteristic may correspond to how easily the ownship may undergo a hazardous movement (e.g., an excessive roll) when encountering a wake vortex. The characteristic may correspond to a value of the orientation parameter at which it is unlikely that a typical pilot of the ownship can safely return the ownship to level flight when the ownship is in a wake vortex condition. In some embodiments, the orientation threshold includes a roll angle that is greater than or equal to forty degrees and less than or equal to sixty degrees relative to level flight (e.g., relative to an angular orientation with respect to the roll axis at which a direction vector associated with movement of the ownship is perpendicular to a direction of gravity).

A step (340) may include determining the ownship to be in a wake vortex condition based on at least one wake vortex criteria, the at least one wake vortex criteria including the orientation parameter being greater than the orientation threshold for more than a predetermined period of time. The predetermined period of time may be on the order of seconds or fractions of seconds (e.g., 0.1 seconds, 0.5 seconds, 1 second, 3 seconds, 5 seconds, 10 seconds). The predetermined period of time may be determined based on a characteristic of the ownship.

In some embodiments, the at least one wake vortex criteria includes motion of an aircraft control surface not being caused by a flight control device, such as to distinguish purposeful operation of the ownship from a wake vortex condition. The method 300 may include monitoring motion of an aircraft control surface, and determining an expected motion of the aircraft control surface based on a control signal transmitted to the aircraft control surface by a flight control device. A criteria of the at least one wake vortex criteria associated with aircraft control surface motion may be satisfied if the detected motion of the aircraft control surface is greater than the expected motion (e.g., for more than a predetermined period of time).

In some embodiments, the at least one wake vortex criteria includes confirming that motion of an aircraft control surface or the ownship is not caused by an autopilot failure. The method 300 may include monitoring a control command outputted by an autopilot system to an aircraft control surface to determine whether the autopilot system has failed. The at least one wake vortex criteria associated with autopilot failure may be satisfied based on determining that the autopilot system has not failed.

Figure 4:
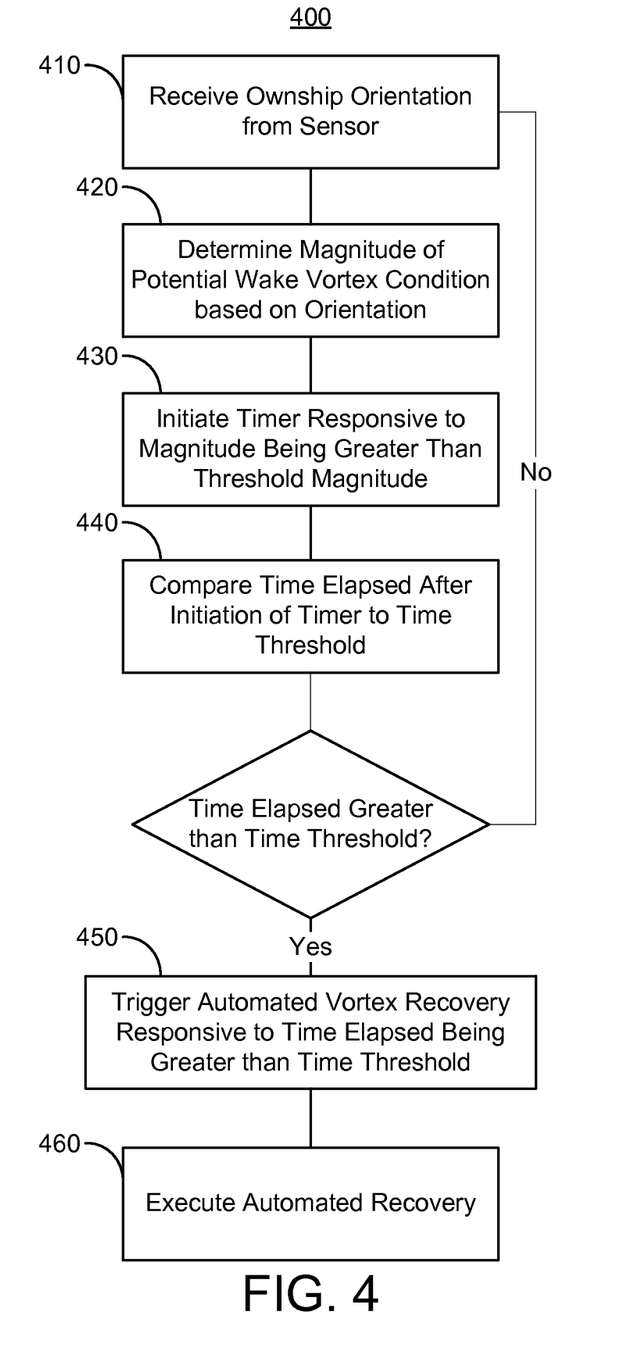
FIG. 4 is a diagram of another exemplary embodiment of another method according to the inventive concepts disclosed herein.

Referring now to FIG. 4 an exemplary embodiment of a method 400 according to the inventive concepts disclosed herein may include the following steps. The method 400 may be performed using various hardware, apparatuses, and systems disclosed herein, such as the aircraft control center 10, the system 200, the avionics controller circuit 210, and/or components thereof.

A step (410) may include receiving an orientation of an ownship from a sensor of the ownship, the sensor configured to detect the orientation. The sensor may include one or more of an inertial measurement unit, a GPS device, a global navigation satellite system receiver, an altimeter, a gyroscope, a magnetic compass, an accelerometer, a temperature sensor, a vision system (e.g., a camera, an infrared image sensor, a LIDAR), or an air data sensor (e.g., sensor(s) configured to detect and output an indication of static pressure). In some embodiments, the sensor includes an attitude and heading reference system or an inertial reference system. The ownship orientation may include an angular orientation of the ownship (e.g., relative to level flight).

A step (420) may include determining a magnitude of a potential wake vortex condition based on the orientation. The magnitude of the potential wake vortex condition may be a relative or absolute value of an orientation parameter determined based on the orientation (e.g., relative or absolute roll angle, roll speed, roll orientation). The magnitude of the potential wake vortex condition may be determined based on the orientation being greater than an expected or maximum magnitude tolerated for the orientation. For example, the magnitude may be determined based on a roll angle, roll rate, or roll acceleration being excessive or undesirable (e.g., greater than the expected or maximum magnitude).

A step (430) may include initiating a timer responsive to the magnitude being greater than a threshold magnitude. The threshold magnitude may be determined in a similar manner as to magnitudes used to determine whether the at least one wake vortex criteria is satisfied (e.g., based on size, weight, or other characteristics of the ownship). In some embodiments, the threshold magnitude is zero (e.g., if the magnitude was previously determined based on thresholds, such that the calculated magnitude indicates an actual wake vortex condition).

A step (440) may include comparing a time elapsed after initiation of the time to a time threshold. If the time elapsed is determined to be greater than the time threshold, then a step (450) may include triggering an automated vortex recovery responsive to the time elapsed being greater than the time threshold. Triggering the automated vortex recovery may include generating and transmitting one or more trigger signals to appropriate components (e.g., autoflight systems, flight control devices) to execute vortex recovery maneuvers. If the time elapsed is determine to not be greater than the time threshold, then the method 400 may terminate (or may return to an earlier step, such as step 410 as shown in FIG. 4).

A step (460) may include executing the automated recovery. For example, responsive to receiving trigger signals, various components (e.g., autoflight systems, flight control devices) may execute appropriate vortex recovery maneuvers. The method 400 may include preventing an autoflight system from disengaging while executing the automated flight recovery.

In some embodiments, the method 400 includes executing the automated vortex recovery by controlling an airspeed of the ownship using a throttle, and controlling an orientation of the ownship using an orientation control device.

The method 400 may include executing automated vortex recovery based on a flight phase or state. For example, the method 400 may include determining whether the ownship is in an approach phase of a flight. If the ownship is in the approach phase, the method may include at least one of alerting a pilot to increase an airspeed of the ownship or causing an autothrottle to advance the throttle; pushing a yoke forward to unload wings of the ownship; causing the ownship to continue a roll in a direction of the wake vortex until wings return to level flight; and transitioning the ownship to a normal go around mode for thrust and pitch control.

If the ownship is not in the approach phase, the method 400 may include at least one of alerting the pilot to maintain the airspeed of the ownship or causing the autothrottle to control operation of the throttle to maintain the airspeed of the ownship; pushing the yoke forward to unload the wings; causing the ownship to continue the roll in the direction of the wake vortex until the wings return to level flight; and transitioning the ownship to normal altitude hold and speed hold for a vertical axis, and heading hold for a lateral axis.

In some embodiments, the method 400 includes restricting operation of a flight control device while executing the automated vortex recovery. For example, flight control devices may be prevented from transmitting control signals to aircraft control surfaces unless then control signals were caused by or approved by a flight controller which executes the automated vortex recovery. The flight control devices may include at least one of a roll spoiler, a pitch trim system, or a yaw damping system.

As will be appreciated from the above, systems and methods for an avionics graphics interface according to embodiments of the inventive concepts disclosed herein may improve operation of autonomous vehicles, including control systems and electronics of autonomous vehicles, by enabling autonomous vehicles to provide a shared mental model at a high level of semantic understanding to a human operator, and to perform maneuvers in a manner consistent with how a vehicle controlled by a human operator would behave.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. An avionics controller circuit configured to:
   receive an ownship orientation from a sensor configured to detect the ownship orientation;
   determine an orientation parameter based on the ownship orientation;
   compare the orientation parameter to an orientation threshold;
   determine the ownship to be in a wake vortex condition based on at least one wake vortex criteria, the at least one wake vortex criteria including the orientation parameter being greater than the orientation threshold for more than a predetermined period of time and a comparison of the orientation parameter and a position of a control surface of the aircraft; and
   output an indication of the wake vortex condition using at least one of a flight display or an audio output device.

2. The avionics controller circuit of claim 1, wherein the orientation parameter includes at least one of a roll angle, a roll rate, or a roll acceleration.

3. The avionics controller circuit of claim 1, wherein the orientation threshold is associated with at least one of a size, weight, or performance characteristic of the ownship.

4. The avionics controller circuit of claim 1, wherein the orientation threshold includes a roll angle of forty-five degrees relative to level flight.

5. The avionics controller circuit of claim 1, wherein the avionics controller circuit is configured to monitor motion of an aircraft control surface and determine an expected motion of the aircraft control surface based on a control signal transmitted to the aircraft control surface by a flight control device, and the at least one wake vortex criteria includes motion of the aircraft control surface being greater than an expected motion for more than a predetermined period of time for the motion.

6. The avionics controller circuit of claim 1, further comprising an autopilot system configured to output a control command to an aircraft control surface, and the at least one vortex criteria includes determining that the autopilot system has not failed based on the control command.

7. The avionics control circuits of claim 1, wherein the controller circuit is configured to determine that the ownship is not in the wake vortex condition if the ownship is determined to be purposefully maneuvered using position data so that the orientation parameter exceeds the orientation threshold.

8. An avionics control system, comprising:
   an avionics controller circuit configured to:
      receive an orientation of an ownship from a sensor of the ownship, the sensor configured to detect the orientation;
      receive a position of a control surface of the ownship;
      determine a magnitude of a potential wake vortex condition based on the orientation;
      initiate a timer responsive to the magnitude being greater than a threshold magnitude;
      reset the timer responsive to the magnitude being less than the threshold magnitude;
      compare a time elapsed after initiation of the timer to a time threshold;
      trigger an automated vortex recovery responsive to the time elapsed being greater than the time threshold and the position of the control surface of the aircraft; and
      execute the automated vortex recovery.

9. The avionics control system of claim 8, further comprising a throttle configured to control an airspeed of the ownship and an orientation control device configured to control the orientation of the ownship, wherein the avionics controller circuit is configured to execute the automated vortex recovery by controlling operation of the throttle and the orientation control device.

10. The avionics control system of claim 9, wherein the avionics controller circuit is configured to:
   determine whether the ownship is in an approach phase of a flight; and
   responsive to determining that the ownship is in the approach phase of the flight:
      at least one of alert a pilot to increase an airspeed of the ownship or cause an autothrottle to advance the throttle;
      push a yoke forward to unload wings of the ownship;
      cause the ownship to continue a roll in a direction of the wake vortex until the wings return to level flight; and transition the ownship to a normal go around mode for thrust and pitch control.

11. The avionics control system of claim 10, wherein responsive to determining that the ownship is not in the approach phase of the flight, the avionics controller circuit is configured to:
at least one of alert the pilot to maintain the airspeed of the ownship or cause the autothrottle to control operation of the throttle to maintain the airspeed of the ownship;
push the yoke forward to unload the wings;
cause the ownship to continue the roll in the direction of the wake vortex until the wings return to level flight; and
transition the ownship to normal altitude hold and speed hold for a vertical axis, and heading hold for a lateral axis.

12. The avionics control system of claim 8, wherein the avionics control system includes one of an autoflight system, an electronic flight instrument system, or an engine indicating and crew alerting system, which includes the avionics controller circuit.

13. The avionics control system of claim 8, wherein the avionics controller circuit is further configured to restrict operation of a flight control device while executing the automated vortex recovery.

14. The avionics control system of claim 13, wherein the flight control device includes at least one of a roll spoiler, a pitch trim system, or a yaw damping system.

15. An avionics control system, comprising:
an avionics controller circuit configured to:
receive an orientation of an ownship from a sensor of the ownship, the sensor configured to detect the orientation;
determine a magnitude of a potential wake vortex condition based on the orientation;
initiate a timer responsive to the magnitude being greater than a threshold magnitude;
initiate a timer responsive to the magnitude being less than the threshold magnitude;
reset the timer responsive to the magnitude being less than the threshold magnitude;
compare a time elapsed after initiation of the timer to a time threshold magnitude;
trigger an automated vortex recovery responsive to the time elapsed being greater than the time threshold; and
execute the automated vortex recovery, wherein the avionics controller circuit is configured to determine whether an autoflight system is engaged, prevent the autoflight system from disengaging while executing the automated vortex recovery if the autoflight system is engaged, and automatically engage the autoflight system if the autoflight system is disengaged, the autoflight system including at least one of an autothrottle or an autopilot.

16. A method, comprising:
receiving ownship orientation data from a sensor configured to detect ownship orientation of an ownship;
receive position data associated with a control surface of the ownship;
determining an orientation parameter based on the ownship orientation data;
comparing the orientation parameter to an orientation threshold;
determining the ownship to be in a wake vortex condition based on at least one wake vortex criteria, the at least one wake vortex criteria including the orientation parameter being greater than the orientation threshold for more than a predetermined period of time, wherein the ownship is determined not to be in the wake vortex condition if the ownship is determined to be purposefully controlled using the position data; so that the orientation parameter exceeds the orientation threshold and
outputting an indication of the wake vortex condition using at least one of a flight display or an audio output device.

17. The method of claim 16, wherein the orientation parameter includes at least one of a roll angle, a roll rate, or a roll acceleration.

18. The method of claim 16, wherein the orientation threshold is associated with at least one of a size, weight, or performance characteristic of the ownship.

19. The method of claim 16, further comprising:
monitoring motion of an aircraft control surface; and
determining an expected motion of the aircraft control surface based on a control signal transmitted to the aircraft control surface by a flight control device, wherein the at least one wake vortex criteria includes motion of the aircraft control surface being greater than the expected motion for more than a predetermined period of time for the motion.

20. The method of claim 16, further comprising monitoring a control command outputted by an autopilot system to an aircraft control surface, wherein the at least one vortex criteria includes determining that the autopilot system has not failed based on the control command.

* * * * *